US010681351B2

(12) United States Patent
Huang et al.

(10) Patent No.: US 10,681,351 B2
(45) Date of Patent: Jun. 9, 2020

(54) METHODS AND APPARATUSES OF REFERENCE QUANTIZATION PARAMETER DERIVATION IN VIDEO PROCESSING SYSTEM

(71) Applicant: MEDIATEK INC., Hsin-Chu (TW)

(72) Inventors: Han Huang, San Jose, CA (US);
Ching-Yeh Chen, Taipei (TW);
Tzu-Der Chuang, Zhubei (TW);
Yu-Wen Huang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/319,917

(22) PCT Filed: Jul. 26, 2017

(86) PCT No.: PCT/CN2017/094431
§ 371 (c)(1),
(2) Date: Jan. 23, 2019

(87) PCT Pub. No.: WO2018/019248
PCT Pub. Date: Feb. 1, 2018

(65) Prior Publication Data
US 2019/0273923 A1 Sep. 5, 2019

(30) Foreign Application Priority Data

Jul. 28, 2016 (WO) ................ PCT/CN2016/092011

(51) Int. Cl.
*H04N 19/124* (2014.01)
*H04N 19/174* (2014.01)
(Continued)

(52) U.S. Cl.
CPC ......... *H04N 19/124* (2014.11); *H04N 19/174* (2014.11); *H04N 19/176* (2014.11);
(Continued)

(58) Field of Classification Search
None
See application file for complete search history.

(56) References Cited

U.S. PATENT DOCUMENTS

| 2005/0169374 A1 | 8/2005 | Marpe et al. |
| 2011/0150077 A1 | 6/2011 | Kishore et al. |
| (Continued) | | |

FOREIGN PATENT DOCUMENTS

| CN | 103210647 A | 7/2013 |
| CN | 103947204 A | 7/2014 |
| (Continued) | | |

OTHER PUBLICATIONS

International Search Report dated Sep. 28, 2017, issued in application No. PCT/CN2017/094431.
(Continued)

*Primary Examiner* — Christopher G Findley
(74) *Attorney, Agent, or Firm* — McClure, Qualey & Rodack, LLP

(57) ABSTRACT

Processing methods and apparatuses for video data comprise receiving input data associated with a current coding block (CB) in a current slice, deriving a top-left location of a current quantization group containing the current CB using a recursive process or a tracking process, and determining a reference quantization parameter (QP) according to the top-left location of the current quantization group. The current CB is encoded or decoded according to the reference QP. The reference QP may be further derived based on a previous QP determined by a tracking method.

9 Claims, 9 Drawing Sheets

(51) Int. Cl.
  *H04N 19/176* (2014.01)
  *H04N 19/96* (2014.01)
  *H04N 19/70* (2014.01)
  *H04N 19/463* (2014.01)
  *H04N 19/196* (2014.01)

(52) U.S. Cl.
  CPC ......... *H04N 19/196* (2014.11); *H04N 19/463* (2014.11); *H04N 19/70* (2014.11); *H04N 19/96* (2014.11)

(56) References Cited

U.S. PATENT DOCUMENTS

| | | | |
|---|---|---|---|
| 2012/0243614 A1 | 9/2012 | Hong et al. | |
| 2014/0241422 A1 | 8/2014 | Lee et al. | |
| 2014/0286403 A1* | 9/2014 | Nishitani | H04N 19/463 375/240.03 |
| 2014/0348227 A1* | 11/2014 | Lee | H04N 19/91 375/240.03 |
| 2015/0071344 A1* | 3/2015 | Tourapis | H04N 19/124 375/240.03 |
| 2015/0189319 A1 | 7/2015 | Pu et al. | |
| 2015/0264405 A1 | 9/2015 | Zhang et al. | |
| 2016/0073111 A1 | 3/2016 | Lee et al. | |
| 2016/0150230 A1 | 5/2016 | He | |
| 2018/0020241 A1* | 1/2018 | Li | H04N 19/136 |

FOREIGN PATENT DOCUMENTS

| | | |
|---|---|---|
| CN | 104205845 A | 12/2014 |
| CN | 105635735 A | 6/2016 |
| EP | 2 763 412 A1 | 8/2014 |
| EP | 2 988 504 A1 | 2/2016 |
| WO | 2012/062161 A1 | 5/2012 |
| WO | 2015/187978 A1 | 12/2015 |
| WO | 2016/090568 A1 | 6/2016 |

OTHER PUBLICATIONS

"Series H: Audiovisual and Multimedia Systems Infrastructure of audiovisual services—High efficiency video coding," Telecommunication Standardization Sector of ITU; Apr. 2015; pp. 1-3.

Bross, B., et al.; "High Efficiency Video Coding (HEVC) text specification draft 10;" Joint Collaborative Team on Video Coding (JCT-VC) of ITU-T SG 16 WP 3 and ISO/IEC JTC 1/SC 29/WG 11; Jan. 2013; pp. 1-332.

\* cited by examiner

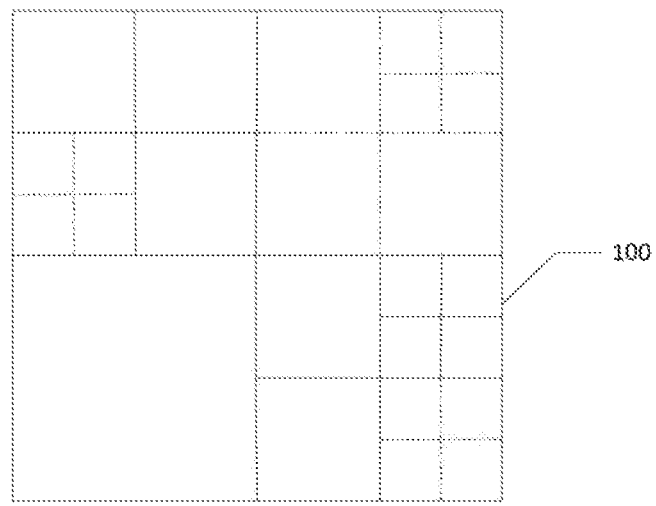
Fig. 1
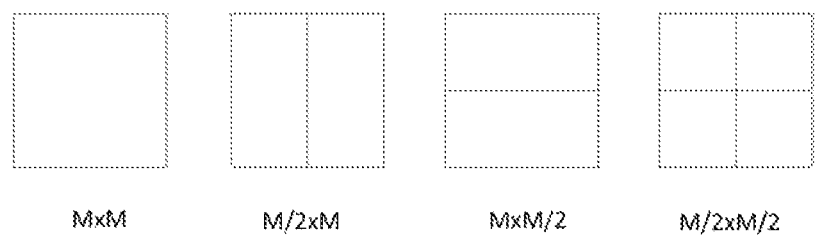
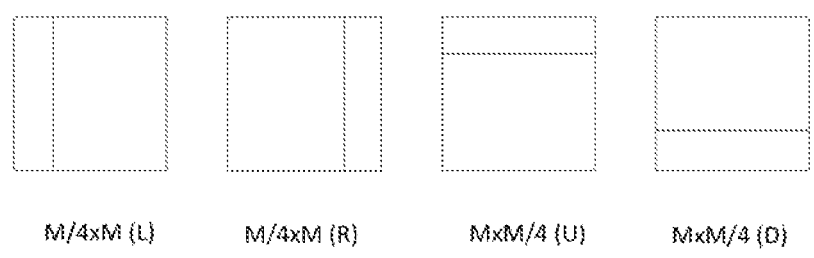
Fig. 2

```
if( log2CbWidth + log2CbHeight >= (Log2MinCuQpDeltaSize<<1) ) {
  xQg = xCb
  yQg = yCb
} else {
  log2CqtSize = Log2CtbSize - cqtDepth
  if( (log2CqtSize == log2CbWidth && log2CqtSize == log2CbHeight) || log2CqtSize <
Log2MinCuQpDeltaSize ) {
    xQg = xCb - ( xCb & ( ( 1 << Log2MinCuQpDeltaSize) - 1 ) )
    yQg = yCb - ( yCb & ( ( 1 << Log2MinCuQpDeltaSize) - 1 ) )
  } else {
    xQg = xCqt = ( xCb >> log2CqtSize << log2CqtSize)
    yQg = yCqt = ( yCb >> log2CqtSize << log2CqtSize)
    if( x0 != xCb || y0 != yCb ) {
      bFound=false
      recursiveBtQuSearch( xCqt, yCqt, log2CqtSize, log2CqtSize, xCb, yCb, xQg, yQg,
bFound )
    }
  }
}
```

Fig. 6

```
recursiveBtQuSearch( x0,y0,log2Width,log2Height,xCb,yCb,xQg,yQg,bFound ) {
if( !bFound ) {
 if( log2Width + log2Height >= (Log2MinCuQpDeltaSize<<1) ) {
    xQg = x0
    yQg = y0
  }
  if( qt_split_flag[x0][y0] ) {
   x1 = x0 + ( 1 << ( log2Width - 1 ) )
   y1 = y0 + ( 1 << ( log2Height - 1 ) )
   recursiveBtQuSearch( x0, y0, log2Width - 1, log2Height - 1, xCb, yCb, xQg, yQg, bFound );
   recursiveBtQuSearch( x1, y0, log2Width - 1, log2Height - 1, xCb, yCb, xQg, yQg, bFound);
   recursiveBtQuSearch( x0, y1, log2Width - 1, log2Height - 1, xCb, yCb, xQg, yQg, bFound );
   recursiveBtQuSearch( x1, y1, log2Width - 1, log2Height - 1, xCb, yCb, xQg, yQg, bFound );
   } else {
    if( bt_cu_split_flag[x0][y0] == 1 ) {
     y1 = y0 + ( 1 << ( log2Height - 1 ) )
     recursiveBtQuSearch( x0, y0, log2Width, log2Height - 1, xCb, yCb, xQg, yQg, bFound );
     recursiveBtQuSearch( x0, y1, log2Width, log2Height - 1, xCb, yCb, xQg, yQg, bFound );
    } else if ( bt_cu_split_flag[x0][y0] == 2 ) {
     x1 = x0 + ( 1 << ( log2Width - 1 ) )
     recursiveBtQuSearch( x0, y0, log2Width - 1, log2Height, xCb, yCb, xQg, yQg, bFound );
     recursiveBtQuSearch( x1, y0, log2Width - 1, log2Height, xCb, yCb, xQg, yQg, bFound );
    } else {
     if( x0 == xCb && y0 == yCb )
       bFound = true
     }
   }
  }
}
```

Fig. 7

| coding_qtbt( x0, y0, log2CbWidth, log2CbHeight, cqtDepth ) { | Descriptor |
|---|---|
|   if( x0 + ( 1 << log2CbWidth ) <= pic_width_in_luma_samples &&<br>    y0 + ( 1 << log2CbHeight ) <= pic_height_in_luma_samples &&<br>    (CbLog2SizeY >> cqtDepth) == (1<<log2CbWidth) && log2CbWidth ==<br>    log2CbHeight && log2CbWidth > MinQtLog2SizeY ) | |
|     qt_split_cu_flag[ x0 ][ y0 ] | ae(v) |
|   if( cu_qp_delta_enabled_flag && log2CbWidth+log2CbHeight >=<br>    (Log2MinCuQpDeltaSize<<1) ) { | |
|     IsCuQpDeltaCoded = 0 | |
|     CuQpDeltaVal = 0 | |
|     QuLastCodedQP = LastCodedQP | |
|     xQg = x0 | |
|     yQg = y0 | |
|   } | |
|   if( qt_split_cu_flag[ x0 ][ y0 ] ) { | |
|     x1 = x0 + ( 1 << ( log2CbWidth - 1 ) ) | |
|     y1 = y0 + ( 1 << ( log2CbHeight - 1 ) ) | |
|     coding_qtbt( x0, y0, log2CbWidth - 1, log2CbHeight - 1, cqtDepth + 1 ) | |
|     if( x1 < pic_width_in_luma_samples ) | |
|       coding_qtbt ( x1, y0, log2CbWidth - 1, log2CbHeight - 1, cqtDepth + 1 ) | |
|     if( y1 < pic_height_in_luma_samples ) | |
|       coding_qtbt ( x0, y1, log2CbWidth - 1, log2CbHeight - 1, cqtDepth + 1 ) | |
|     if( x1 < pic_width_in_luma_samples && y1 < pic_height_in_luma_samples ) | |
|       coding_qtbt ( x1, y1, log2CbWidth - 1, log2CbHeight - 1, cqtDepth + 1 ) | |
|   } else { | |
|     if( (log2CbWidth > MinBtLog2SizeY \|\| log2CbHeight > MinBtLog2SizeY) &&<br>    log2CbWidth <= MaxBtLog2SizeY ) { | |
|       bt_split_mode[ x0 ][ y0 ] | ae(v) |
|       if( bt_split_mode[x0][y0] == 1 ) { | |
|         y1 = y0 + ( 1 << ( log2CbHeight - 1 ) ) | |
|         coding_qtbt ( x0, y0, log2CbWidth, log2CbHeight - 1, cqtDepth ) | |
|         if( y1 < pic_height_in_luma_samples ) | |
|           coding_qtbt ( x0, y1, log2CbWidth, log2CbHeight - 1, cqtDepth ) | |
|       } else if( bt_split_mode[x0][y0] == 2 ) { | |
|         x1 = x0 + ( 1 << ( log2CbWidth - 1 ) ) | |
|         coding_qtbt ( x0, y0, log2CbWidth-1, log2CbHeight, cqtDepth ) | |
|         if( x1 < pic_width_in_luma_samples ) | |
|           coding_qtbt ( x1, y0, log2CbWidth-1, log2CbHeight, cqtDepth ) | |
|       } else | |
|         coding_unit( x0, y0, log2CbWidth, log2CbHeight) | |
|     } | |
|   } | |
| } | |

Fig. 8

| coding_unit( x0, y0, log2CbWidth, log2CbHeight ) { | Descriptor |
|---|---|
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   if( cu_skip_flag[ x0 ][ y0 ] ) | |
|     prediction_unit( x0, y0, log2CbWidth, log2CbHeight) | |
|   else { | |
|     if( slice_type != I ) | |
|       pred_mode_flag | ae(v) |
|     if( CuPredMode[ x0 ][ y0 ] == MODE_INTRA ) { | |
|       if( pcm_enabled_flag && log2CbWidth+log2CbHeight >= Log2MinIpcmCbSizeY*2 && log2CbWidth+log2CbHeight <= Log2MaxIpcmCbSizeY*2 ) | |
|         pcm_flag[ x0 ][ y0 ] | ae(v) |
|       if( pcm_flag[ x0 ][ y0 ] ) { | |
|         while( !byte_aligned( ) ) | |
|           pcm_alignment_zero_bit | f(1) |
|         pcm_sample( x0, y0, log2CbWidth, log2CbHeight) | |
|       } else { | |
|         prev_intra_luma_pred_flag[ x0 ][ y0 ] | ae(v) |
|         if( prev_intra_luma_pred_flag[ x0 ][ y0 ] ) | |
|           mpm_idx[ x0 ][ y0 ] | ae(v) |
|         else | |
|           rem_intra_luma_pred_mode[ x0 ][ y0 ] | ae(v) |
|         intra_chroma_pred_mode[ x0 ][ y0 ] | ae(v) |
|       } | |
|     } else { | |
|       prediction_unit( x0, y0, log2CbWidth, log2CbHeight) | |
|     } | |
|     if( !pcm_flag[ x0 ][ y0 ] ) { | |
|       if( CuPredMode[ x0 ][ y0 ] != MODE_INTRA && !merge_flag[ x0 ][ y0 ] ) | |
|         rqt_root_cbf | ae(v) |
|       if( rqt_root_cbf ) { | |
|         MaxTrafoDepth = ( CuPredMode[ x0 ][ y0 ] == MODE_INTRA ? ( max_transform_hierarchy_depth_intra + IntraSplitFlag ) : max_transform_hierarchy_depth_inter ) | |
|         transform_unit( x0, y0, log2CbWidth, log2CbHeight) | |
|       } | |
|     } | |
|   } | |
|   LastCodedQP = Qp$_Y$ | |
| } | |

Fig. 9

METHODS AND APPARATUSES OF REFERENCE QUANTIZATION PARAMETER DERIVATION IN VIDEO PROCESSING SYSTEM

CROSS REFERENCE TO RELATED APPLICATIONS

The present invention claims priority to PCT Patent Application Serial No. PCT/CN2016/092011, filed on Jul. 28, 2016, entitled "Methods of reference quantization parameter derivation for signaling of quantization parameter in Quad-tree plus binary tree structure". The PCT Patent Application is hereby incorporated by reference in its entirety.

FIELD OF THE INVENTION

The present invention relates to video data processing methods and apparatuses for video encoding or video decoding. In particular, the present invention relates to video data processing methods and apparatuses encode or decode video data according to reference quantization parameters derived for quantization parameter signaling.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard relies on a block-based coding structure which divides each slice into multiple Coding Tree Units (CTUs). In the HEVC main profile, the minimum and the maximum sizes of a CTU are specified by syntax elements signaled in the Sequence Parameter Set (SPS). The CTUs in a slice are processed according to a raster scan order. Each CTU is further recursively divided into one or more Coding Units (CUs) according to a quadtree partitioning method to adapt to various local characteristics. The CU size is restricted to be less than or equal to a minimum allowed CU size, which is also specified in the SPS. An example of the quadtree block partitioning structure for a CTU is illustrated in FIG. 1, where the solid lines indicate CU boundaries in CTU 100.

The prediction decision is made at the CU level, where each CU is either coded by Inter picture prediction or Intra picture prediction. Once the splitting of CU hierarchical tree is done, each CU is subject to further split into one or more Prediction Units (PUs) according to a PU partition type for prediction. FIG. 2 shows eight PU partition types defined in the HEVC standard. Each CU is split into one, two, or four PUs according to one of the eight PU partition types shown in FIG. 2. The PU works as a basic representative block for sharing the prediction information as the same prediction process is applied to all pixels in the PU and prediction relevant information is conveying to the decoder on a PU basis. After obtaining a residual signal generated by the prediction process, residual data of the residual signal belong to a CU is split into one or more Transform Units (TUs) according to another quadtree block partitioning structure for transforming the residual data into transform coefficients for compact data representation. The dotted lines in FIG. 1 indicate TU boundaries. The TU is a basic representative block for applying transform and quantization on the residual signal. For each TU, a transform matrix having the same size as the TU is applied to the residual signal to generate the transform coefficients, and these transform coefficients are quantized and conveyed to the decoder on a TU basis.

The terms Coding Tree Block (CTB), Coding block (CB), Prediction Block (PB), and Transform Block (TB) are defined to specify two-dimensional sample array of one color component associated with the CTU, CU, PU, and TU respectively. For example, a CTU consists of one luminance (luma) CTB, two chrominance (chroma) CTBs, and its associated syntax elements. In the HEVC system, the same quadtree block partitioning structure is generally applied to both luma and chroma components unless a minimum size for chroma block is reached.

An alternative partitioning method is called binary tree block partitioning, where a block is recursively split into two smaller blocks. A simplest binary tree partitioning method only allows symmetrical horizontal splitting and symmetrical vertical splitting. Although the binary tree partitioning method supports more partition shapes and thus is more flexible than the quadtree partitioning method, the coding complexity and signaling overhead increase for selecting the best partition shape among all possible partition shapes. A combined partitioning method called Quad-Tree-Binary-Tree (QTBT) structure combines a quadtree partitioning method with a binary tree partitioning method, which balances the coding efficiency and the coding complexity of the two partitioning methods. An exemplary QTBT structure is shown in FIG. 3A, where a large block such as a CTU is firstly partitioned by a quadtree partitioning method then a binary tree partitioning method. FIG. 3A illustrates an example of block partitioning structure according to the QTBT partitioning method and FIG. 3B illustrates a coding tree diagram for the QTBT block partitioning structure shown in FIG. 3A. The solid lines in FIGS. 3A and 3B indicate quadtree splitting while the dotted lines indicate binary tree splitting. In each splitting (i.e., non-leaf) node of the binary tree structure, one flag indicates which splitting type (symmetric horizontal splitting or symmetric vertical splitting) is used, 0 indicates horizontal splitting and 1 indicates vertical splitting. It is possible to simplify the partitioning process by omitting the splitting from CU to PU and from CU to TU, as the leaf nodes of a binary tree block partitioning structure is the basic representative block for both prediction and transform coding. For example, the QTBT structure shown in FIG. 3A splits the large block into multiple smaller blocks, and these smaller blocks are processed by prediction and transform coding without further splitting.

Another partitioning method called triple tree partitioning method is introduced to capture objects which locate in the block center while quadtree partitioning method and binary tree partitioning method always split along the block center. Two exemplary triple tree partition types include horizontal center-side triple tree partitioning and vertical center-side triple tree partitioning. The triple tree partitioning method may provide capability to faster localize small objects along block boundaries, by allowing one-quarter partitioning vertically or horizontally.

A quantization parameter (QP) is determined by a reference QP and a delta QP when adaptive QP or multi-QP optimization is enabled in HEVC. The delta QP is transmitted instead of the QP in order to reduce the bit rate required for QP information. Delta QP signaling for the luma component is controlled by two flags, an enable flag cu_qp_delta_enabled_flag and a depth flag diff_cu_qp_delta_depth. The enable flag, cu_qp_delta_enabled_flag, is used to indicate delta QP signaling is enabled or disabled, and the depth flag, diff_cu_qp_delta_depth, is used to set the minimum size for delta QP signaling. The depth flag diff_cu_qp_delta_depth is presented at a high level syntax. A Coding Block (CB) larger than or equal to a minimum size for delta QP signaling has its own delta QP, whereas a CB smaller than the minimum size shares a delta QP with one or more other CBs. A single CB having its own delta QP or a number of CBs sharing the same delta QP is referred to as a quantization group or quantization unit. FIG. 4 illustrates an example of quantization groups in the CTU of FIG. 1, where the size of the CTU is 64×64 and the minimum size for delta QP signaling is 16×16. The thick solid lines in FIG. 6 represent the boundaries of the quantization groups, the solid lines represent CU boundaries, and the dotted lines represent TU boundaries. Multiple CUs in one quantization group share the same delta QP.

In the HEVC standard, the reference QP of a current quantization group is derived from QPs of left and above neighboring coded quantization groups, where the reference QP is an average of the two QPs. If any one of the left and above neighboring coded quantization group is unavailable, the unavailable QP is replaced by a previous QP of a previous coded quantization group in the decoding order. A default QP such as the slice QP is used as the previous QP if the previous coded quantization group is unavailable.

For encoding or decoding video data according to the HEVC standard, derivation of a reference QP may require the previous QP of a previous coded quantization group in the decoding order, where the previous coded quantization group is determined according to a z-scan order index of a current quantization group. Let the coordinate for a top-left luminance sample of a current picture to be (0,0), and the coordinate for a top-left luminance sample 460 of a current luminance coding block 46 to be (xCb, yCb) in FIG. 4. The current luminance coding block 46 is within a current quantization group 44. The location (xQg, yQg) specifies a top-left luminance sample 440 of the current quantization group 44 relative to the top-left luminance sample of the current picture. The horizontal position xQg of the top-left luminance sample 440 is set equal to xCb−(xCb & ((1<<Log 2MinCuQpDeltaSize)−1)), and the vertical position yQg of the top-left luminance sample 440 is set equal to yCb−(yCb & ((1<<Log 2MinCuQpDeltaSize)−1)), where Log 2MinCuQpDeltaSize represents the log 2 value of a minimum size for delta QP signaling. After deriving the top-left location (xQg, yQg) of the current quantization group 44, a z-scan order index of the current quantization group 44 is used to derive the z-scan order index of a previous coded quantization group 42. For example, the previous coded quantization group 42 in the decoding order is derived by the z-scan order index of the current quantization group minus 1.

BRIEF SUMMARY OF THE INVENTION

Methods and apparatuses of processing video data in a video coding system determine a reference quantization parameter (QP) of a current coding block (CB) and the current CB is encoded or decoded according to the determined reference QP. The video data of a color component in a slice is partitioned into multiple CBs according to a partitioning method. Examples of the color component are luminance component and chrominance components. An example of the partitioning method first splits the video data by quadtree partitioning then split by binary tree partitioning or triple tree partitioning. The methods and apparatuses comprise receiving Input data associated with the current CB in a current slice by an encoder or a decoder. The encoder or decoder derives a top-left location (xQg, yQg) of a current quantization group containing the current CB using a recursive process or a tracking process. The reference QP for the current CB is determined by one or more neighboring QPs of the current quantization group, and the neighboring QPs of the current quantization group are determined by the top-left location (xQg, yQg) of the current quantization group.

Some embodiments of the recursive process for derivation of the reference QP first check if a size of the current CB is larger than or equal to a minimum area for delta QP, and the top-left location (xQg, yQg) is set equal to a top-left location (xCb, yCb) of the current CB if the size of the current CB is larger than or equal to the minimum area for delta QP. The recursive process also comprises checking if the current CB is a quadtree leaf node block or if an area of a current quadtree leaf node block containing the current CB is smaller than the minimum area for delta QP signaling, and the top-left location (xQg, yQg) is derived using the top-left location (xCb, yCb) and the minimum area for delta QP signaling if the checking result is affirmative. Otherwise, a location (x0, y0) of a current recursion is initialized as a top-left location (xCqt, yCqt) of a current quadtree leaf node block containing the current CB, and the location (x0, y0) is recursively updated according to a split flag for the current recursion until the location (x0, y0) is equal to the top-left location (xCb, yCb) of the current CB. The top-left location (xQg, yQg) is updated to be equal to the location (x0, y0) of the current recursion if an area of the current recursion is larger than or equal to the minimum area for delta QP signaling. Embodiments of the derived top-left location (xQg, yQg) of the current quantization group is used to determine neighboring QPs of neighboring blocks, for example, a left QP of a left neighboring block of the current quantization group and an above QP of an above neighboring block of the current quantization group. The reference QP is calculated based on the neighboring QPs of the neighboring blocks.

In an embodiment, the top-left location (xCb, yCb) and a log 2 value of the minimum area for delta QP signaling Log 2MinCuQpDeltaSize may be used to derive the top-left location (xQg, yQg) by: xQg=xCb−(xCb & ((1<<Log 2MinCuQpDeltaSize)−1)), and yQg=yCb−(yCb & ((1<<Log 2MinCuQpDeltaSize)−1)); or xQg=(xCb>>Log 2MinCuQpDeltaSize<<Log 2MinCuQpDeltaSize), and yQg=(yCb>>Log 2MinCuQpDeltaSize<<Log 2MinCuQpDeltaSize).

In an embodiment, the size of the current quadtree leaf node block is derived by a size of a CTB and a quadtree depth of the current quadtree leaf node block. The location (xCqt, yCqt) of the current quadtree leaf node block is derived using a log 2 value of the size of the current quadtree leaf node block log 2CqtSize by: xCqt=(xCb>>log 2CqtSize<<log 2CqtSize), and yCqt=(yCb>>log 2CqtSize<<log 2CqtSize); or xCqt=xCb−(xCb & ((1<<log 2CqtSize)−1)), and yCqt=yCb−(yCb & ((1<<log 2CqtSize)−1)). The split flag for the current recursion is selected from one of a quadtree split flag and a binary tree split flag when the partitioning method is Quad-Tree-Binary-Tree (QTBT) partitioning method.

Some embodiments of the tracking process for derivation of the reference QP comprise tracking a location (x0, y0) of a current block according to a split type and one or both of a width of the current block and a height of the current block. An initial current block may be a coding tree block (CTB) containing the current CB. The top-left location (xQg, yQg)

is determined to be equal to the location (x0, y0) when an area of the current block is greater than or equal to the minimum area for delta QP signaling. The top-left location (xQg, yQg) derived by the tracking process is then used to determine the reference QP for the current CB. For example, the encoder or decoder determines one or more neighboring QP according to the top-left location (xQg, yQg) to calculate the reference QP.

For the tracking process, the location (x0, y0) of the current block is updated according to a split flag and both the height and weight of the current block when the split type is quadtree split. The location of the current block is updated according to a binary tree split mode and one of the width and height of the current block when the split type is a binary tree split. The updated location is checked to be within the current slice or the current picture.

In some embodiments, the reference QP for the current CB is further determined based on a previous QP if any of the neighboring QP of the current quantization group is unavailable. The previous QP is used to replace the unavailable neighboring QP. The previous QP may be determined by a tracking method. The tracking method first initializes the previous QP as a last coded QP of a previous coded Coding Tree Unit (CTU) or a slice QP if the previous coded CTU is unavailable. The previous QP is updated as a derived QP after a derivation process for quantization parameter of the current CB for a subsequent quantization group. An example of the derivation process derives the derived QP according to the top-left location (xCb, yCb) of the current CB and the top-left location (xQg, yQg) of the current quantization group. The derived QP may be calculated by a predicted QP, a delta QP, and a bit depth of samples of a luminance array.

Aspects of the disclosure further provide an apparatus for the video coding system encoding or decoding video data according to reference QPs determined according to locations derived by a recursive process or a tracking process.

Aspects of the disclosure further provide a non-transitory computer readable medium storing program instructions for causing a processing circuit of an apparatus to perform video coding process deriving reference QPs according to locations derived by a recursive process or a tracking process. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein:

FIG. 1 illustrates an exemplary coding tree for splitting a Coding Tree Unit (CTU) into Coding Units (CUs) and splitting each CU into one or more Transform Units (TUs) according to the HEVC standard.

FIG. 2 illustrates eight different Prediction Unit (PU) partition types splitting a CU into one or more PUs according to the HEVC standard.

FIG. 6 shows exemplary pseudo codes for derivation of a top-left location of a current quantization group using the recursive process according to an embodiment of the present invention.

FIG. 7 shows exemplary pseudo codes for derivation of a top-left location of a current quantization group using the recursive process according to an embodiment of the present invention.

FIG. 8 shows exemplary syntax table for the tracking process according to an embodiment of the present invention.

FIG. 9 shows exemplary syntax table for the tracking process according to an embodiment of the present invention.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Figure 3A:
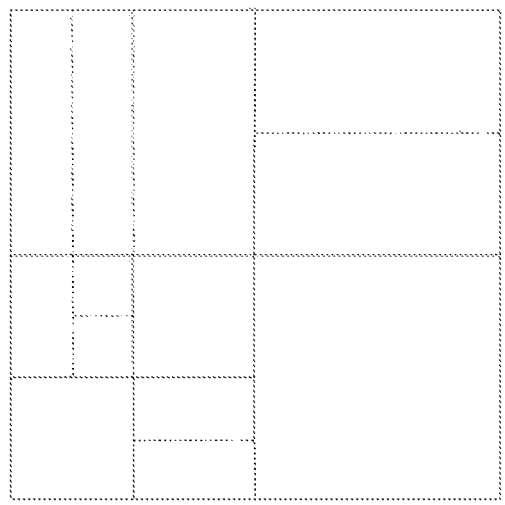
FIG. 3A illustrates an exemplary block partitioning structure of a Quad-Tree-Binary-Tree (QTBT) partitioning method.
Figure 3B:
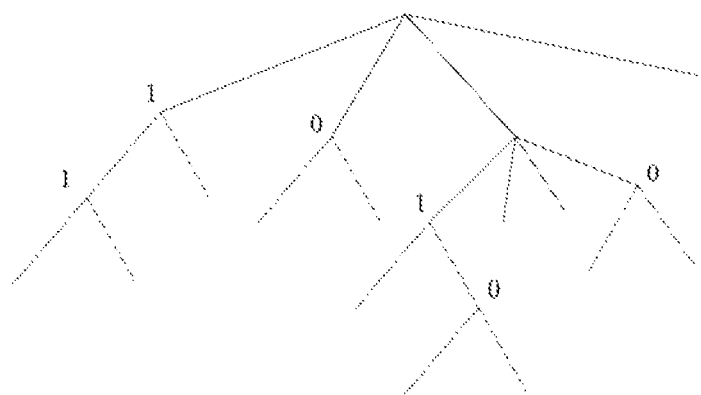
FIG. 3B illustrates a coding tree structure corresponding to the block partitioning structure of FIG. 3A.
Figure 4:
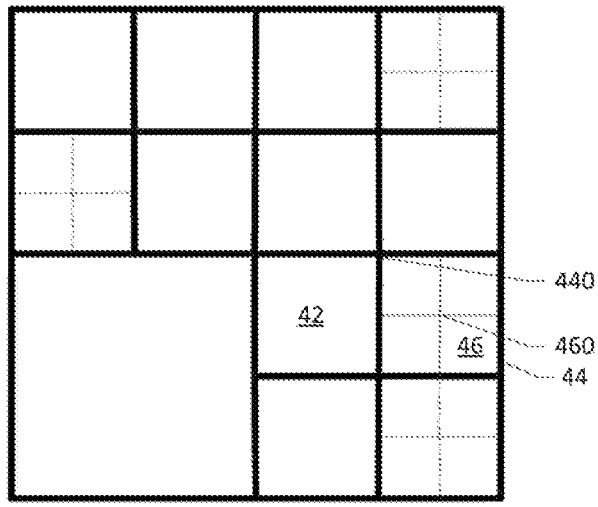
FIG. 4 illustrates exemplary quantization groups in the CTU of FIG. 1.
Figure 5:
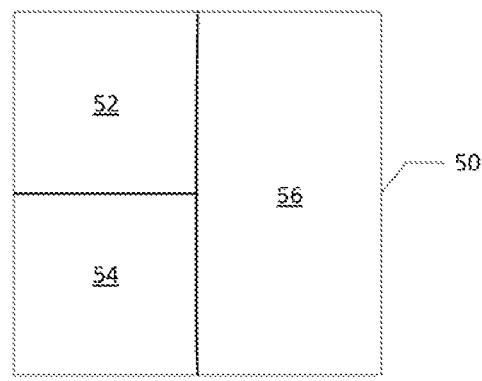
FIG. 5 illustrates an example of quantization groups of a large block partitioned by the QTBT partitioning method and a previous quantization group in the decoding order may not be correctly derived according to a z-scan order index of a current quantization group.

The coding blocks split according to partitioning methods other than the quadtree partitioning method may not be all squares. For example, both QTBT and triple tree partitioning methods generate some rectangular shape coding blocks and thus some quantization groups are also rectangular shape. For non-square quantization groups, the horizontal and vertical positions xQg and yQg of a top-left luminance sample of a current quantization group cannot be simply derived by a minimum luminance size of the quantization group. In addition, the previous quantization group in the decoding order may not be simply derived by the z-scan order index. FIG. 5 shows an example of quantization groups 52, 54, and 56 split from a large block 50 according to the QTBT partitioning method, where the large block 50 is first partitioned by a vertical split, and then the left partition is further partitioned by a horizontal split. Let curr denotes the z-scan order index of a current quantization group 56, and the z-scan order index minus 1 (i.e. curr−1) indicates the quantization group 52 at the top of the left partition. However, the previous coded quantization group in the decoding order is actually the quantization group 54 at the bottom of the left partition.

Embodiments of the present invention derive a reference QP for a coding block by determining a top-left location (xQg, yQg) of a quantization group containing the coding block according to a recursive process or a tracking process. Some embodiments of the present invention further derive the reference QP by determining a previous QP of a previous coded quantization group of the coding block.

Recursive process for determining a top-left location of a current quantization group Some embodiments of the present invention determine a top-left location of a current quantization group using a recursive process. The block partitioning method used to partition video data in the embodiments may generate non-square blocks, for example, the block partitioning method first partitions a luminance Coding Tree Block (CTB) by quadtree splitting to generate luminance (luma) quadtree leaf node blocks, then each luma quadtree leaf node block may be further partitioned using binary tree splitting or triple tree splitting. In this embodiment, the luma quadtree leaf node block is defined as the block at which the quadtree splitting stopped so the luma quadtree leaf node block is always square. Let a location (xCb, yCb) specifies a top-left sample of a current luminance Coding Block (CB) in a current picture relative to a top-left sample of the current picture. The log 2 value of the width and height of the current luminance coding block are log 2CbWidth and log 2CbHeight respectively, and the log 2 value of the size of the luminance CTB is Log 2CtbSize. The width and height of a luminance coding block are not necessarily equal but the width and height of a luminance CTB are equal as the luminance CTB is square. The variable cqtDepth specifies the quadtree depth of a quadtree leaf node block that contains the current coding block. A location (xQg, yQg) specifies a top-left sample of a current quantization group relative to the top-left sample of the current picture. The current luminance coding block is within the current quantization group.

If an area of the current luminance coding block is larger than or equal to a minimum area for delta QP signaling, the top-left sample of the current luminance coding block is also the top-left sample of the current quantization group, so the location (xQg, YQg) is equal to the location (xCb, yCb). The following illustrates the comparison between the area of the current luminance coding block and the minimum area for delta QP signaling:

log 2CbWidth+log 2CbHeight>=(Log 2MinCuQpDeltaSize<<1).

If the current luminance coding block is a luma quadtree leaf node block, or if the area of the current leaf node block that contains the current luminance coding block is smaller than the minimum area for delta QP signaling, the location (xQg, yQg) of the top-left sample of the current quantization group is derived as:

xQg=xCb−(xCb&((1<<Log 2MinCuQpDeltaSize)−1))

yQg=yCb−(yCb&((1<<Log 2MinCuQpDeltaSize)−1))

or, equivalently, xQg=(xCb>>Log 2MinCuQpDeltaSize<<Log 2MinCuQpDeltaSize)

yQg=(yCb>>Log 2MinCuQpDeltaSize<<Log 2MinCuQpDeltaSize).

In other cases, a recursive process is invoked to derive the location (xQg, yQg) of the top-left sample of the current quantization group. A variable log 2CqtSize specifies the log 2 value of a size of the current luma quadtree leaf node block, and this variable is calculated by the size of luminance CTB and the quadtree depth of the current luma quadtree leaf node block:

log 2CqtSize=log 2 CtbSize−cqtDepth.

A location (xCqt, yCqt) specifies the top-left sample of the current luma quadtree leaf node block that contains the current luminance coding block, and the location (xCqt, yCqt) can be derived by:

xCqt=(xCb>>log 2CqtSize<<log 2CqtSize), yCqt=(yCb>>log 2CqtSize<<log 2CqtSize);

or, equivalently, xCqt=xCb−(xCb&((1<<log 2CqtSize)−1)), yCqt=yCb−(yCb&((1<<log 2CqtSize)−1)).

A variable bFound specifies that whether the top-left location (xQg, yQg) of the current quantization group is found, and the recursive process is terminated when bFound is true. The inputs to the recursive process are a location (x0, y0) of a current recursion, the log 2 value of the block width log 2Width, the log 2 value of the block height log 2Height, the top-left location (xCb, yCb) of the current coding block, the top-left location (xQg, yQg) of the current quantization group, and the variable bFound. The location (x0, y0) of the current recursion is initialized as the top-left location (xCqt, yCqt) of a current luma quadtree leaf node block containing the current luminance coding block, the log 2 value of the block width log 2Width is initialized as log 2CqtSize, the log 2 value of the block height log 2Height is also initialized as log 2CqtSize, and the variable bFound is initialized as false. In the recursive process, the location (xQg, yQg) is set equal to the location (x0, y0) of a current recursion if the area of the current recursion is larger than or equal to the minimum area for delta QP signaling. The variable bFound is set to true if the location (x0, y0) of the current recursion is equal to (xCb, yCb), and the recursion process stopped when the variable bFound is true. Otherwise the variable bFound is still false and the recursive process proceeds to search the location (xQg, yQg).

The pseudo code of derivation of the top-left location (xQg, yQg) of the current quantization group using the recursive process is shown in FIG. 6 and FIG. 7. In FIG. 7, a quadtree split flag qt_split_flag [x0][y0] specifies whether a block at location (x0, y0) is quadtree split, and a binary tree split flag bt_cu_split_flag [x0][y0] specifies a binary tree split type of a block at location (x0, y0), where 0 indicates no further split, 1 indicates horizontal split, and 2 indicates vertical split. The location (x0, y0) of the current recursion is recursively updated according to a quadtree split flag or a binary split flag until the location (x0, y0) is equal to the top-left location (xCb, yCb) of the current luminance coding block. In each recursion, the top-left location (xQg, yQg) of the current quantization group is updated to be equal to the location (x0, y0) of the current recursion if an area of the current recursion is larger than or equal to the minimum area for delta QP signaling. The partitioning method used to split the video data is QTBT partitioning in FIG. 6 and FIG. 7, however the same recursive process can be applied to other partitioning methods. For example, if the partitioning method is triple tree partitioning, the location (x0, y0) of a current recursion is recursively updated according to whether the current recursion is a horizontal triple tree split or vertical triple tree split), and the top-left location (xQg, yQg) of a current quantization group is updated to be equal to the location (x0, y0) if an area of the current recursion is larger than or equal to the minimum area for delta QP signaling. In another example, the partitioning method first splits the video data with the quadtree partitioning, then binary tree partitioning or triple tree partitioning, the location (x0, y0) of a current recursion is recursively updated according to whether the current recursion is a quadtree split, horizontal binary tree split, vertical binary tree split, horizontal triple tree split, or vertical triple tree split.

After the derivation of the top-left location (xQg, yQg) of the current quantization group, a reference QP is derived by one or more neighboring QP of one or more neighboring blocks of the current quantization group. For example, the reference QP is derived by a left QP of a left neighboring block of the current quantization group and an above QP of an above neighboring block of the current quantization group. The encoder quantizes a residual signal of the current luminance coding block according to a QP for the current luminance coding block, derives a delta QP from the QP and the reference QP, and signals the delta QP for the current luminance coding block in a video bitstream. The decoder determines a delta QP for a current luminance coding block from a received video bitstream, derives a QP for the current luminance coding block from the delta QP and the reference QP, and recovers a quantized residual signal of the current luminance coding block according to the QP for the current luminance coding block.

Tracking for a top-left location of a current quantization group and QP of a previous quantization group Some embodiments of the present invention track the top-left location (xQg, yQg) of a current quantization group during video encoding or decoding. The top-left location (xQg, yQg) is initialized to a location of a top-left luminance sample of a current Coding Tree Block (CTB). For video data coded using a partitioning method such as the QTBT partitioning method, the top-left location (xQg, yQg) is set equal to the top-left location of a current coding block if an enable flag cu_qp_delta_enabled_flag indicates enabled and an area of the current coding block is larger than or equal to the minimum size for delta QP signaling, i.e. log 2CbWidth+log 2CbHeight>=(Log 2MinCuQpDeltaSize<<1). Details of the corresponding syntax table for the tracking process are included in FIG. 8.

In the syntax table of FIG. 8, the inputs of a function coding_qtbt include a location of a current block (x0, y0), a log 2 value of a width of the current block log 2CbWidth, a log 2 value of a height of the current block log 2CbHeight, and a depth cqtDepth. A split flag qt_split_cu_flag [x0][y0] is determined by the function coding_qtbt. The top-left location (xQg, yQg) is determined as a location of the current block (x0, y0) and a previous QP of a previous coded quantization group QuLastCodedQP is determined as a last coded QP of the current block LastCodeQP when the enable flag cu_qp_delta_enabled_flag is true and an area of a current block is greater than or equal to the minimum size for delta QP signaling. When the current partitioning is a quadtree split, the location of the current block is updated according to the split flag qt_split_cu_flag [x0][y0], the width and height of the current block. The updated location of the current block is checked to be within the current slice or the current picture, and the updated location, a half of the width, i.e. log 2CbWidth−1, a half of the height, i.e. log 2CbHeight−1, and cqtDepth+1 are used as the inputs to the function coding_qtbt. When the current partitioning is a binary tree split, according to a binary tree split mode bt_split_mode, the location of the current block (x0, y0) is updated based on the width or height of the current block. For example, the location of the current block is updated based on the height if the binary tree split mode is horizontal split, and the updated location is checked to be within the current slice or the current picture. The updated location, the width log 2CbWidth, a half of the height, i.e. log 2CbHeight−1, and cqtDepth are the inputs of the function coding_qtbt. In another example, the location of the current block is updated based on the width if the binary tree split mode is vertical split, and the updated location is check to be within the current picture. The function coding_qtbt is executed by providing the updated location, a half of the width log 2CbWidth−1, the height log 2CbHeight, and cqtDepth. The embodiment in FIG. 8 splits the video data using QTBT partitioning method, similar tracking process may be applied to video data split using other partitioning methods. An exemplary partitioning method splits the video data using quadtree partitioning then binary partitioning or triple tree partitioning, and syntax table in FIG. 8 only needs to insert one more branch for the case when the current partitioning is a triple tree split, where the location of the current block (x0, y0) is updated according to a horizontal triple tree split or vertical triple tree split when the current partitioning is the triple tree split.

Embodiments of the method also track a previous quantization parameter (QP) of a previous coded quantization group, denoted as QuLastCodedQP. In one embodiment, a variable LastCodedQP is used to specify the previous QP of the previous coded coding block. The variable QuLastCodedQP and LastCodedQP are initialized at the beginning of encoding or decoding a current CTU, where the initial value is set to the LastCodedQP of a previous coded CTU, or the initial value is set to a slice QP if the previous coded CTU is unavailable. The variable QuLastCodedQP is set equal to LastCodedQP when an enable flag cu_qp_delta_enabled_flag is true and an area of the current coding block is larger than or equal to the minimum size for delta QP signaling, i.e. log 2CbWidth+log 2CbHeight>=(Log 2MinCuQpDeltaSize<<1). In other words, the variable QuLastCodedQP is set equal to LastCodedQP when the first coding block of a quantization group is encountered during encoding or decoding. An example of the corresponding syntax table is shown in FIG. 8.

After encoding or decoding a current coding block, LastCodedQP is set equal to the QP of the current coding block $Qp_Y$. An example of the corresponding syntax table is shown in FIG. 9.

Given the derived location (xQg, yQg) of the top-left sample of the current quantization group and the previous QP QuLastCodedQP, the reference QP of a coding block can be derived according to one or both of the location (xQg, yQg) and the previous QP. For example, the top-left location (xQg, yQg) of the current quantization group is first used to identify the left and above neighboring coded blocks. The reference QP of the current quantization group is calculated as an average of a left QP of the left neighboring coded block and an above QP of the above neighboring coded block, that is (QpLeft+QpAbove+1)>>1. If any of the left QP and the above QP is not available, the QP value of the unavailable neighboring QP is replaced by the derived previous QP QuLastCodedQP to calculate the reference QP. The reference QP is used to determine a delta QP after quantizing video data associated with a quantization group at the encoder side; and the reference QP is used to determine a QP for inverse quantization based on a received delta QP at the decoder side.

In another method of tracking the previous QP of the previous coded quantization group, QuLastCodedQP, the assist variable LastCodedQP is not used. The variable QuLastCodedQP is initialized at the beginning of encoding or decoding each CTU, and QuLastCodedQP is updated as the derived QP, i.e. $QP_Y$, after a derivation process for the quantization parameter of the coding block. The derivation process for the quantization parameter of the coding block is described in the following. The derivation process derives a variable $QP_Y$, a luminance QP $QP'_Y$, and a chrominance QPs $QP'_{Cb}$ and $QP'_{Cr}$ from locations (xCb, yCb) and (xQg, yQg). The location (xCb, yCb) specifies a top-left luminance sample of a current luminance coding block in a current picture relative to a top-left luminance sample of the current picture, and the location (xQg, yQg) specifies a top-left luminance sample of a current quantization group relative to the top-left luminance sample of the current picture. A minimum size for delta QP signaling is defined by a variable Log 2MinCuQpDeltaSize, which determines the luminance size of the smallest area inside a CTB that shares the same QP. A predicted luminance QP $qP_{Y\_PRED}$ is derived by the following steps:

In step 1, the predicted luminance QP $qP_{Y\_PRED}$ for a current coding block is set equal to the slice QP $SliceQp_Y$ if one or more of the following three conditions are true. The first condition is when a current quantization group containing the current coding block is the first quantization group in a slice. The second condition is when the current quantization group containing the current coding block is the first quantization group in a tile. The third condition is when the current quantization group containing the current coding block is the first quantization group in a coding tree block row and an enable flag entropy_coding_sync_enabled_flag is true indicating entropy coding synchronizing is enabled. The predicted luminance QP $qP_{Y\_PRED}$ is set equal to QuLastCodedQP if all of the three conditions are not true.

In step 2, a left QP of a left neighboring block of the current quantization group is determined for calculating a reference QP. An availability derivation process determines whether the left QP is available according to locations (xCurr, yCurr) and (xNbY, yNbY), where the location (xCurr, yCurr) is set to equal to the top-left location (xCb, yCb) of the current coding block, and the neighboring location (xNbY, yNbY) is set to equal to (xQg−1, yQg). The left QP $qP_{Y\_A}$ is set equal to the predicted luminance QP $qP_{Y\_PRED}$ if one or more of the following two conditions are true. The first condition is when the output of the availability derivation process indicates the left QP is not available, i.e. a variable availableA is equal to FALSE. The second condition is when a coding tree block address ctbAddrA of the CTB containing the coding block covering the neighboring location (xQg−1, yQg) is not equal to a variable CtbAddrInTs. The variable CtbAddrInTs is derived by:

$xTmp=(xQg-1)$>>Log 2MinTrafoSize $yTmp=yQg$>>Log 2MinTrafoSize $minTbAddrA=MinTbAddrZs[xTmp][yTmp]$ $ctbAddrA=(minTbAddrA$>>$2)*(Ctb$ Log $2SizeY-$Log $2MinTrafoSize);$ where a variable Log 2MinTrafoSize specifies the log 2 value of the minimum transform block size, an array MinTbAddrZs [x][y] specifies the conversion from a location (x,y) in units of minimum transform blocks to a transform block address in z-scan order, and a variable Ctb Log 2SizeY specifies a log 2 value of the size of the Coding Tree Block (CTB).

The left QP $qP_{Y\_A}$ is set equal to a luminance QP $QP_Y$ of the coding block covering the location (xQg−1, yQg) if both of the two above conditions are false.

In step 3, an above QP of an above neighboring block of the current quantization group is determined to calculate the reference QP. Similar to the left QP, an availability derivation process determines whether the above QP is available according to locations (xCurr, yCurr) and (xNbY, yNbY), where the location (xCurr, yCurr) is set to equal to the top-left location (xCb, yCb) of the current coding block, and the neighboring location (xNbY, yNbY) is set to equal to (xQg, yQg−1). The above QP $P_{Y\_B}$ is set equal to the predicted luminance QP $qP_{Y\_PRED}$ if one or more of the following two conditions are true. The first condition is when the output of the availability derivation process indicates the above QP is unavailable, i.e. a variable available is equal to FALSE. The second condition is when a coding tree block address ctbAddrB of the CTB containing the coding block covering the location (xQg, yQg−1) is not equal to a variable ctbAddrInTs, where the variable ctbAddrB is derived by:

$xTmp=xQg$>>Log 2MinTrafoSize, $yTmp=(yQg-1)$>>Log 2MinTrafoSize, $minTbAddrB=MinTbAddrZs[xTmp][yTmp],$ $ctbAddrB=(minTbAddrB$>>$2)*(Ctb$ Log $2SizeY-$Log $2MinTrafoSize);$ where a variable Log 2MinTrafoSize specifies the log 2 value of the minimum transform block size, an array MinTbAddrZs [x][y] specifies the conversion from a location (x,y) in units of minimum transform blocks to a transform block address in z-scan order, and a variable Ctb Log 2SizeY specifies a log 2 value of the size of the Coding Tree Block (CTB).

The above QP $qP_{Y\_B}$ is set equal to a luminance QP $QP_Y$ of the coding block covering the location (xQg, yQg−1) if both of the two above conditions are false.

The predicted luminance QP $qP_{Y\_PRED}$ is derived by an average of the left QP $qP_{Y\_A}$ and the above QP $qP_{Y\_B}$, i.e., $qP_{Y\_PRED}=qP_{Y\_A}+qP_{Y\_B}$ 1)>>1. The variable $Qp_Y$ is derived according to the predicted luminance QP $qP_{Y\_PRED}$.

$QP_Y=((qP_{Y\_PRED}CuQpDeltaVal+52+2*QpBdOffset_Y)$
$\%(52+QpBdOffset_Y))-QpBd$ $Offset_Y;$ where CuQpDeltaVal is a variable defined in the syntax table of FIG. 8 specifies the value of delta QP, and it is initialized as zero, $QpBdoffset_Y=6*bit\_depth\_luma\_minus8$, and bit_depth_luma_minus8 specifies the bit depth of the samples of the luminance array $BitDepth_Y$, and $BitDepth_Y=8+bit\_depth\_luma\_minus8$.

The above reference QP derivation process may be performed separately for luminance and chrominance components if the luminance and chrominance CTBs are separated coded.

Figure 10:
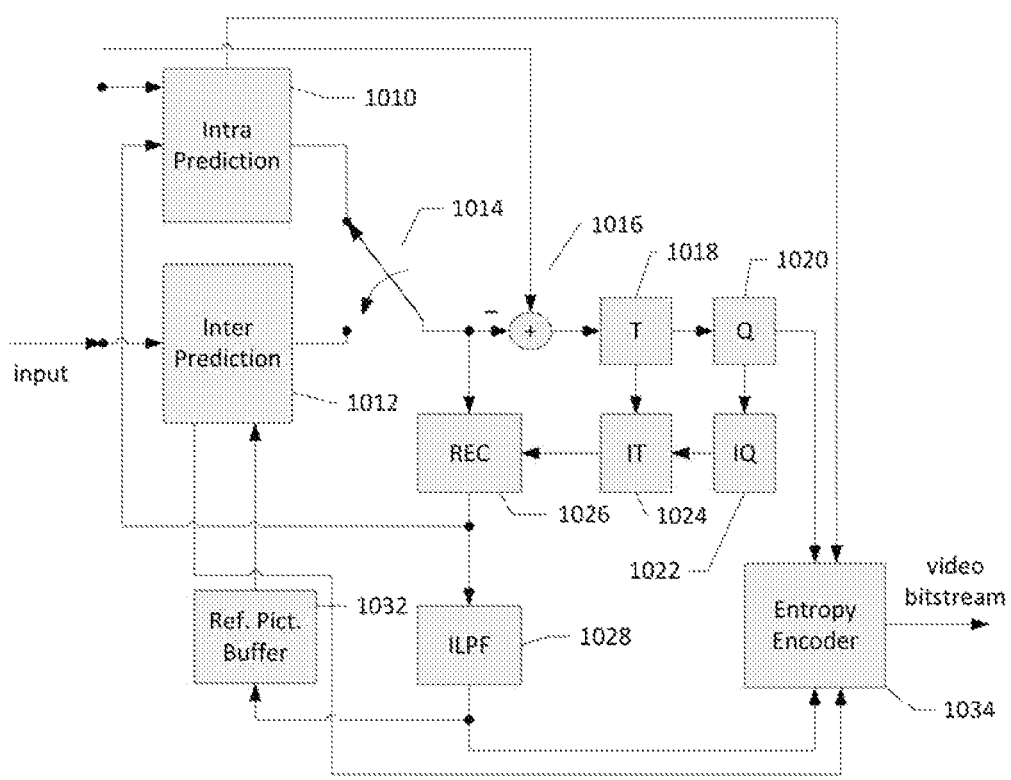
FIG. 10 illustrates an exemplary system block diagram for a video encoding system incorporating the video data processing method according to embodiments of the present invention.

FIG. 10 illustrates an exemplary system block diagram for a Video Encoder 1000 implementing embodiments of the present invention. Intra Prediction 1010 provides intra predictors based on reconstructed video data of a current picture. Inter Prediction 1012 performs motion estimation (ME) and motion compensation (MC) to provide predictors based on referencing video data from other picture or pictures. Either Intra Prediction 1010 or Inter Prediction 1012 supplies the selected predictor to Adder 1016 to form residues. The residues of the current block are further processed by Transformation (T) 1018 followed by Quantization (Q) 1020. The transformed and quantized residual signal is then encoded by Entropy Encoder 1034 to form a video bitstream. In Quantization 1020, the transformed residues of each quantization group are quantized by a QP, and a reference QP is determined according to one of the embodiments of the present invention to derive a delta QP for each quantization group. The video bitstream is then packed with side information including the delta QP for each quantization group. The reference QP for a current quantization group is derived according to one or both of a top-left location of the current quantization group and a previous coded QP. The transformed and quantized residual signal of the current block is processed by Inverse Quantization (IQ) 1022 and Inverse Transformation (IT) 1024 to recover the prediction residues. As shown in FIG. 10, the residues are recovered by adding back to the selected predictor at Reconstruction (REC) 1026 to produce reconstructed video data. The reconstructed video data may be stored in Reference Picture Buffer (Ref. Pict. Buffer) 1032 and used for prediction of other pictures. The reconstructed video data from REC 1026 may be subject to various impairments due to the encoding processing, consequently, In-loop Processing Filter (ILPF) 1028 is applied to the reconstructed video data before storing in the Reference Picture Buffer 1032 to further enhance picture quality. Syntax elements are provided to Entropy Encoder 1034 for incorporation into the video bitstream.

Figure 11:
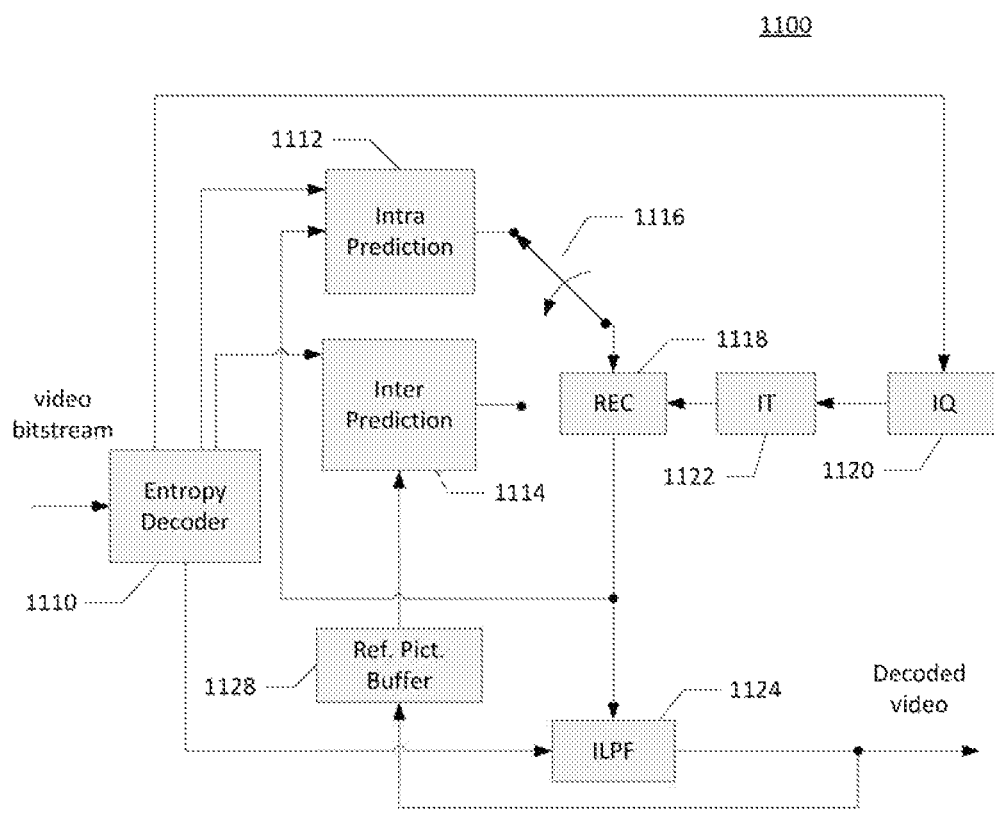
FIG. 11 illustrates an exemplary system block diagram for a video decoding system incorporating the video data processing method according to embodiments of the present invention.

A corresponding Video Decoder 1100 for Video Encoder 1000 of FIG. 10 is shown in FIG. 11. The video bitstream encoded by a video encoder is the input to Video Decoder 1100 and is decoded by Entropy Decoder 1110 to parse and recover the transformed and quantized residual signal and other system information. Entropy Decoder 1110 parses a delta QP for each quantization group. The decoding process of Decoder 1100 is similar to the reconstruction loop at Encoder 1000, except Decoder 1100 only requires motion compensation prediction in Inter Prediction 1114. Each block is decoded by either Intra Prediction 1112 or Inter Prediction 1114. Switch 1116 selects an intra predictor from Intra Prediction 1112 or Inter predictor from Inter Prediction 1114 according to decoded mode information. The transformed and quantized residual signal is recovered by Inverse Quantization (IQ) 1120 and Inverse Transformation (IT) 1122. Inverse Quantization 1120 determines a reference QP for a current quantization group and recovers the quantized residual signal associated with the current quantization group according to a QP derived from the delta QP parsed by Entropy Decoder 1110 and the reference QP. The reference QP is derived according to one or both of a top-left location of the current quantization group and a previous QP. The top-left location may be derived using a recursive process or a tracking process according to an embodiment, and the previous QP may be derived according to an embodiment of the tracking method. The recovered residual signal is reconstructed by adding back the predictor in REC 1118 to produce reconstructed video. The reconstructed video is further processed by In-loop Processing Filter (ILPF) 1124 to generate final decoded video. If the currently decoded picture is a reference picture, the reconstructed video of the currently decoded picture is also stored in Ref. Pict. Buffer 1128 for later pictures in decoding order.

Various components of Video Encoder 1000 and Video Decoder 1100 in FIG. 10 and FIG. 11 may be implemented by hardware components, one or more processors configured to execute program instructions stored in a memory, or a combination of hardware and processor. For example, a processor executes program instructions to control receiving of input video data. The processor is equipped with a single or multiple processing cores. In some examples, the processor executes program instructions to perform functions in some components in Encoder 1000 and Decoder 1100, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. As shown in FIGS. 10 and 11, Encoder 1000 and Decoder 1100 may be implemented in the same electronic device, so various functional components of Encoder 1000 and Decoder 1100 may be shared or reused if implemented in the same electronic device. For example, one or more of Reconstruction 1026, Inverse Transformation 1024, Inverse Quantization 1022, In-loop Processing Filter 1028, and Reference Picture Buffer 1032 in FIG. 10 may also be used to function as Reconstruction 1118, Inverse Transformation 1122, Inverse Quantization 1120, In-loop Processing Filter 1124, and Reference Picture Buffer 1128 in FIG. 11, respectively.

Embodiments of the video data processing method with conditioned QP information signaling for video coding system may be implemented in a circuit integrated into a video compression chip or program code integrated into video compression software to perform the processing described above. For examples, determining of a current mode set for the current block may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data in a video coding system, wherein video data of a color component in a slice is partitioned into Coding Blocks (CBs) according to a partitioning method, comprising:

receiving input data associated with a current CB in a current slice;

deriving a top-left location (xQg, yQg) of a current quantization group using a tracking process, wherein the tracking process comprises:

tracking and updating a location (x0, y0) of a current block according to a split type and one or both of a width of the current block and a height of the current block, and the top-left location (xQg, yQg) is determined to be equal to the location (x0, y0) when an area of the current block is greater than or equal to the minimum area for delta QP signaling;

determining a reference QP for the current CB by one or more neighboring QP of the current quantization group, wherein the neighboring QP of the current quantization group is determined by the top-left location (xQg, yQg) of the current quantization group; and encoding or decoding the current CB according to the reference QP for the current CB.

2. The method of claim 1, wherein a previous QP is used to replace an unavailable neighboring QP if any of said one or more neighboring QPs of the current quantization group is unavailable, and the reference QP for the current CB is determined based on the previous QP.

3. The method of claim 2, wherein the previous QP is determined by a tracking method, and the tracking method comprises initializing the previous QP as a last coded QP of a previous coded Coding Tree Unit (CTU) or a slice QP if the previous coded CTU is unavailable, tracking the previous QP, and updating the previous QP as a derived QP after a derivation process for quantization parameter of the current CB.

4. The method of claim 3, wherein the derivation process derives the derived QP according to the top-left location (xCb, yCb) of the current CB and the top-left location (xQg, yQg) of the current quantization group.

5. The method of claim 4, wherein the derived QP is calculated by a predicted QP, a delta QP, and a bit depth of samples of a luminance array.

6. The method of claim 1, wherein the location of the current block (x0, y0) is updated according to a split flag and both the height and weight of the current block when the split type is quadtree split, and the updated location is checked to be within the current slice.

7. The method of claim 1, wherein the location of the current block (x0, y0) is updated according to a binary tree split mode and one of the width and height of the current block when the split type is binary tree split, and the updated location is checked to be within the current slice.

8. An apparatus of processing video data in a video coding system, wherein video data of a color component in a slice is partitioned into Coding Blocks (CBs) according to a partitioning method, the apparatus comprising one or more electronic circuits configured for:

receiving input data associated with a current CB in a current slice;

deriving a top-left location (xQg, yQg) of a current quantization group using a tracking process, wherein the tracking process comprises:

tracking and updating a location (x0, y0) of a current block according to a split type and one or both of a width of the current block and a height of the current block, and the top-left location (xQg, yQg) is determined to be equal to the location (x0, y0) when an area of the current block is greater than or equal to the minimum area for delta QP signaling;

determining a reference QP for the current CB by one or more neighboring QP of the current quantization group, wherein the neighboring QP of the current quantization group is determined by the top-left location (xQg, yQg) of the current quantization group; and encoding or decoding the current CB according to the reference QP for the current CB.

9. A non-transitory computer readable medium storing program instruction causing a processing circuit of an apparatus to perform video processing method, and the method comprising:

receiving input data associated with a current CB in a current slice;

deriving a top-left location (xQg, yQg) of a current quantization group using a tracking process, wherein the tracking process comprises:

tracking and updating a location (x0, y0) of a current block according to a split type and one or both of a width of the current block and a height of the current block, and the top-left location (xQg, yQg) is determined to be equal to the location (x0, y0) when an area of the current block is greater than or equal to the minimum area for delta QP signaling;

determining a reference QP for the current CB by one or more neighboring QP of the current quantization group, wherein the neighboring QP of the current quantization group is determined by the top-left location (xQg, yQg) of the current quantization group; and encoding or decoding the current CB according to the reference QP for the current CB.

* * * * *